(12) United States Patent
Nishio et al.

(10) Patent No.: US 7,206,037 B2
(45) Date of Patent: Apr. 17, 2007

(54) DISPLAY MODULE AND DISPLAY UNIT (75) Inventors: Toshiya Nishio, Tottori (JP); Seiji Yamane, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 10/474,195

(22) PCT Filed: Apr. 26, 2002

(86) PCT No.: PCT/JP02/04299

§ 371 (c)(1),
(2), (4) Date: Oct. 16, 2003

(87) PCT Pub. No.: WO02/091340

PCT Pub. Date: Nov. 14, 2002

(65) Prior Publication Data

US 2004/0114062 A1 Jun. 17, 2004

(30) Foreign Application Priority Data

May 9, 2001 (JP) .............................. 2001-138797
May 10, 2001 (JP) .............................. 2001-140410

(51) Int. Cl.
*G02F 1/1333* (2006.01)
(52) U.S. Cl. .......................................... 349/58; 349/60
(58) Field of Classification Search ............ 349/58–60; 361/681
See application file for complete search history.

(56) References Cited

U.S. PATENT DOCUMENTS

| 5,432,626 | A | | 7/1995 | Sasuga et al. | |
|---|---|---|---|---|---|
| 5,946,062 | A | * | 8/1999 | Hasegawa et al. | 349/58 |
| 6,147,724 | A | * | 11/2000 | Yoshii et al. | 349/62 |
| 6,342,932 | B1 | * | 1/2002 | Terao et al. | 349/58 |
| 6,411,353 | B1 | * | 6/2002 | Yarita et al. | 349/59 |
| 6,424,391 | B1 | * | 7/2002 | Tsukamoto et al. | 349/58 |
| 6,741,299 | B2 | * | 5/2004 | Fukayama et al. | 349/58 |

FOREIGN PATENT DOCUMENTS

| JP | 5-50428 | | 2/1993 |
|---|---|---|---|
| JP | 06-222335 | A | 8/1994 |
| JP | 2000-047209 | A | 2/2000 |

OTHER PUBLICATIONS

Taiwanese Office Action Dated Jul. 4, 2003.

* cited by examiner

*Primary Examiner*—David Nelms
*Assistant Examiner*—Michael H. Caley
(74) *Attorney, Agent, or Firm*—Arent Fox LLP (57) ABSTRACT

In a display module having a picture-frame-shaped front frame, notches are formed at both ends of one side edge thereof so as to penetrate from the front surface to the rear surface thereof. This helps realize a compact display unit. Moreover, a metal film or the like is formed on a flexible printed circuit used in the display module, and the flexible printed circuit is fixed to a metal rear casing with a detachable protective plate. This helps realize a display module that permits easy attachment and detachment of a flexible printed circuit and in which sufficient shielding against EMI (the metal film is grounded via the rear casing) is achieved.

11 Claims, 8 Drawing Sheets

-- PRIOR ART --

FIG. 12

-- PRIOR ART --

DISPLAY MODULE AND DISPLAY UNIT

TECHNICAL FIELD

The present invention relates to a display module and a display unit incorporating it, and to a display module employing a direct-lit backlight.

BACKGROUND ART

Conventionally, color television monitors typically employ CRTs (cathode ray tubes). In recent years, however, television monitors employing liquid crystal displays have been put into practical use thanks to slimming-down and low power consumption achieved in modern display modules. The mainstream of display modules for use in television monitors and large-screen monitors is the TFT (thin-film transistor) LCDs (liquid crystal displays). In a TFT LCD, on one of the glass substrates constituting a display panel, scanning lines and signals lines, both connected to TFTs, are formed in a matrix-like formation, and input terminals for those scanning and signal lines are arranged in an edge portion of the glass substrate. In general, there are more signal lines than there are scanning lines, and therefore the input terminals for signal lines are arranged collectively in a longer-side edge portion of the glass substrate, and the input terminals for scanning lies are arranged collectively in a shorter-side edge portion of the glass substrate. The input terminals for signal lines are connected, by TAB (tape-automated bonding), to a source drive circuit board, and the input terminal for scanning lines are connected, by TAB, to a gate drive circuit board. These circuit boards feeds signals to the individual lines. Separately from the source and gate drive circuit boards, there is provided a control circuit board that is electrically connected to the individual drive circuit boards by flexible printed circuits.

On the rear-surface side of the display panel, there is arranged a backlight, which may be either of the side-lit type including a linear lamp arranged on an edge face of a light guide plate or of a direct-lit type including a light source arranged immediately behind the rear surface of the display panel. Display modules for use in notebook personal computers and compact portable terminals, where slimness counts, typically adopt side-lit backlights. On the other hand, display modules for use in liquid crystal television monitors and large-screen monitors, where high brightness counts, typically adopt direct-lit backlights. In a display module with a direct-lit backlight, on the rear-surface side of a display panel, a light source such as a plurality of fluorescent lamps is arranged so as to face the display panel, and, between the light source and the display panel, a diffuser plate, a dimmer plate, and the like are arranged. The florescent lamps are housed in a rear casing formed of, for example, aluminum. In a direct-lit backlight, the distance from the fluorescent lamps to the display panel needs to be adjusted so that the entire display area of the display panel is lit with light with uniform intensity and thus with uniform brightness. Accordingly, the smaller the number of fluorescent lamps, the greater distance needs to be secured therefrom to the display panel. As a result, compared with a side-lit type, a direct-lit backlight unit is thicker, with its rear casing protruding on the rear-surface side of the display panel. To efficiently feed the light from the fluorescent lamps to the display panel, various means are taken such as using the inner surface of the rear casing as a reflector plate or disposing a reflector plate between the rear casing and the fluorescent lamps.

Figure 11:
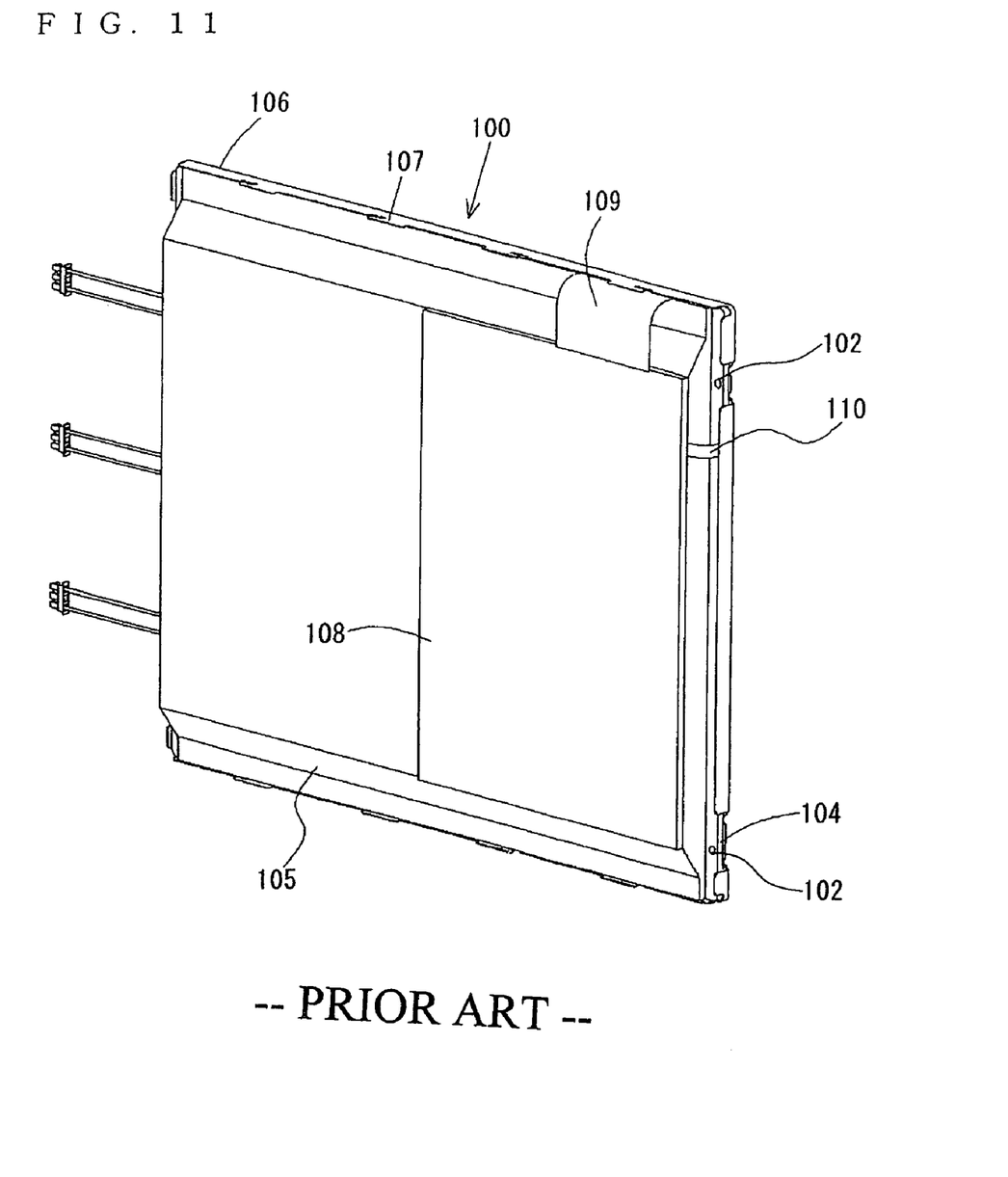
FIG. 11 is a rear perspective view of a conventional display module.

FIG. 11 shows a rear perspective view of such a display module 100, which includes a support frame 104 for housing and supporting a display panel, a rear casing 105 formed of a metal, and a front frame 106 having an opening in the portion thereof corresponding to the display area. The support frame 104 having the display panel housed therein is sandwiched between the rear casing 105 and the front frame 106, and then stopper tags 107 provided in a peripheral portion of the front frame 106 are bent onto the rear casing 105. In this way, these components are assembled into a single unit. On the rear surface of the rear casing 105 is fitted a control circuit board, which is then covered with a protective casing 108. A flexible printed circuit 109 electrically connects together a source drive circuit board fitted on the display panel and the control circuit board fitted on the rear casing 105, and another flexible printed circuit 110 electrically connects together a gate drive circuit board and the control circuit board. In this way, the individual drive circuit boards are fed with signals from the control circuit board.

Conventionally, these flexible printed circuits 109 and 110 are not fixed but left free. However, in display modules for use in television monitors and large-screen monitors, as increasingly large screens and increasingly high resolutions are sought, the number of pixels increases, and thus the number of signal lines increases, making larger particularly the flexible printed circuit 109 that connects to the source drive circuit board. As a result, when the display module is handled, the flexible printed circuit 109 is prone to be caught at some edge or other, leading to imperfect connection or breakage of the flexible printed circuit 109.

The flexible printed circuits may be fixed to the rear casing with double-sided adhesive tape or the like. In that case, however, every time the display module 100 undergoes maintenance, the double-sided adhesive tape needs to be removed or replaced. This leads to poor serviceability.

Furthermore, with conventional flexible printed circuits, satisfactory shielding against EMI (electromagnetic interference) has not been achieved. The display module 100 for use in a television monitor has a large screen, and is required to offer high image quality. Thus, in its flexible printed circuit 109, which is now larger than ever to cope with the increased number of pixels, it is more important than ever to achieve shielding against EMI. An effective way for achieving that end is now being sought.

Figure 12:
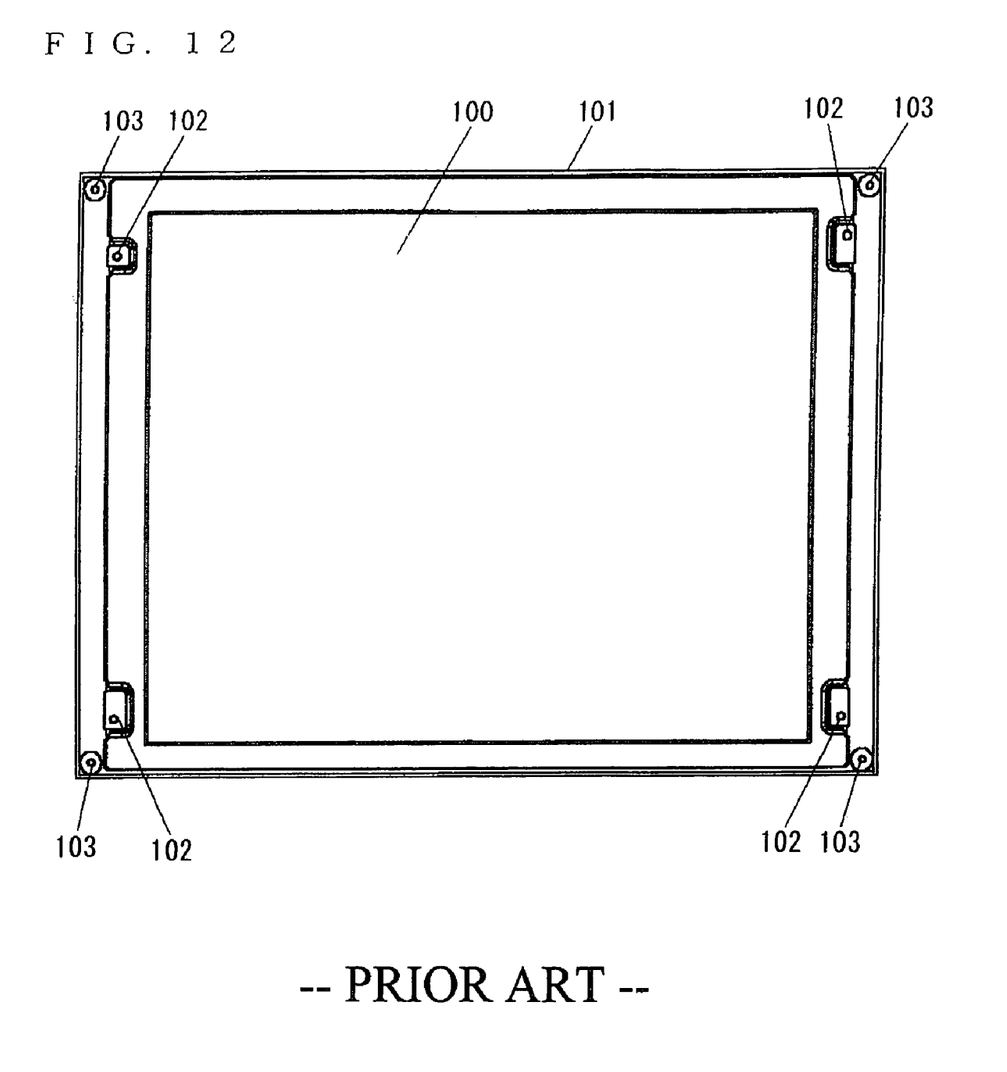
FIG. 12 is a plan view of the conventional display module, with its upper casing removed.

When this display module 100 is used in a display unit such as a liquid crystal television monitor or other monitor, the display module 100 is housed in a decorative casing formed of a resin. At this time, as shown in FIG. 12, the display module 100 is put in a lower case 101, is then fixed thereto with screws put through fitting holes 102 provided in opposite edges of the display module 100, and is then covered with an unillustrated upper casing. The upper and lower casings are fastened together with screws just outside the right and left, or upper and lower, edges of the display module 100. The fastening with screws here is achieved by the use of bosses 103 arranged at least one of the upper and lower casings.

In this way, the bosses 103 used to fasten the casings together are located at both ends of the display module 100. This makes the outer dimensions of the casings so much larger as the extra dimensions occupied by the bosses 103.

DISCLOSURE OF THE INVENTION

An object of the present invention is to provide a display module to which a flexible printed circuit can be fixed so as to be easily removable therefrom and in which satisfactory shielding against EMI is achieved. Another object of the present invention is to provide a display unit that is made compact by minimizing dead space. Still another object of the present invention is to provide a display module suitable for minimization of display units.

To achieve the above object, according to one aspect of the present invention, in a display module provided with a picture-frame-shaped front frame and a display panel that shows through an opening formed in the front frame, with fitting holes formed at opposite side edges of the display module so as to penetrate from the front surface to the rear surface thereof. Here, the notches have a shape convex toward the center of the display module as seen in a plan view, with the inner edge of the notches located inward of the inner edge of the fitting holes.

With this structure, it is possible to provide a display module suitable for miniaturization of a display unit.

The notches may be fan-shaped with a radius greater than the radius of the fitting holes, or may be rectangular.

According to another aspect of the present invention, the display module described above is further provided with circuit boards respectively arranged along two adjacent side edges of the display panel and covered with the front frame, and the notches are formed at both ends of at least one of the side edges of the display panel along which the circuit boards are arranged, with one of the notches located in the area where the extension lines of the circuit boards arranged along the two adjacent side edges of the display panel cross each other.

With this structure, it is possible to provide a display module suitable for miniaturization of a display unit.

The display module may be provided with a support frame that supports the display panel and that has wall surfaces formed along the inner surfaces of the notches. This helps prevent entry of dust through the notches, and thus helps prevent degradation of display quality. Moreover, this structure for preventing entry of dust is used also for the positioning of the front frame, contributing to simplification of the structure.

According to another aspect of the present invention, a display unit is provided with a display module as described above and a pair of casings between which the display module is sandwiched, with bosses formed on at least one of the casings and arranged inside the notches.

With this structure, it is possible to provide a compact display unit of which the frame portion surrounding the display area has a small area.

According to another aspect of the present invention, in a display module provided with a display panel having liquid crystal sealed between a pair of substrates and having scanning lines and signal lines arranged in a matrix-like formation on one of the substrates, a plurality of light sources arranged immediately behind the display panel, a rear casing housing the light sources and covering a rear surface of the display panel, and a front frame arranged on a front surface of the display panel and fixed to the rear casing, the display module is further provided with a first control circuit board mounted on the display panel and feeding image signals to the signal lines, a second control circuit board arranged on the rear surface of the rear casing, a flexible printed circuit electrically connecting the first and second control circuit boards together, and fixing means for detachably fixing the flexible printed circuit to the rear casing.

In the display module described above, the fixing means may be provided with a holding portion formed on the rear casing and a protective plate detachably supported by the holding portion so that the protective plate, when fitted to the holding portion, holds the flexible printed circuit in a state pressed onto the rear casing.

With these structures, it is possible to easily fit the flexible printed circuit to the rear casing, to prevent breakage of the flexible printed circuit during the manufacture or maintenance of the display module, to enhance assembly efficiency, and to reduce the space required to house the flexible printed circuit. Moreover, also at the time of maintenance, it is possible to easily detach the flexible printed circuit, leading to better serviceability.

In the display module described above, the fixing means may be provided with a holding portion formed by cutting and lifting up part of the rear casing and a protective plate detachably supported by the holding portion and formed of a resin so as to be bendable so that the protective plate, when fitted to the holding portion, holds the flexible printed circuit in a state pressed onto the rear casing.

With this structure, it is possible to realize the fixing means inexpensively, and to easily attach and detach the protective plate.

In the display module described above, the rear casing may have at least a portion thereof onto which the flexible printed circuit is pressed formed of a metal and the flexible printed circuit may be provided with a metal film for shielding against EMI so that, when the flexible printed circuit is fixed to the rear casing by the fixing means, the metal film of the flexible printed circuit conducts to the metal portion of the rear casing.

In the display module described above, the rear casing may have at least a portion thereof onto which the flexible printed circuit is pressed formed of a metal and the flexible printed circuit may have a metal film bonded to the greater part of at least one surface thereof for shielding against EMI so that, when the flexible printed circuit is fixed to the rear casing by the fixing means, the metal film of the flexible printed circuit conducts to the metal portion of the rear casing.

In the display module described above, the rear casing may have at least a portion thereof onto which the flexible printed circuit is pressed formed of a metal and the flexible printed circuit may have a metal mesh bonded thereto for shielding against EMI so that, when the flexible printed circuit is fixed to the rear casing by the fixing means, the metal mesh of the flexible printed circuit conducts to the metal portion of the rear casing.

In the display module described above, the rear casing may have at least a portion thereof onto which the flexible printed circuit is pressed formed of a metal and the flexible printed circuit may have multiple layers, with a GND pattern formed in one of the layers, for shielding against EMI so that, when the flexible printed circuit is fixed to the rear casing by the fixing means, the GND pattern of the flexible printed circuit conducts to the metal portion of the rear casing.

With these structures, it is possible to ground, by way of the rear casing, the metal film or the like provided in the flexible printed circuit for shielding against EMI This makes it possible to achieve shielding against EMI with a simple structure and at low cost.

In the invention described first above, the display module may be further provided with a plurality of light sources arranged immediately behind the display panel, a rear casing for housing the light sources and covering the rear-surface side of the display panel, a first control circuit board mounted on the display panel, a second control circuit board arranged on the rear surface of the rear casing, a flexible circuit board for electrically connecting the first and second control circuit boards together, and fixing means for detachably fixing the flexible circuit board to the rear casing.

Here, the fixing means may be provided with a holding portion formed on the rear casing and a protective plate detachably supported by the holding portion so that the protective plate, when fitted to the holding portion, holds the flexible circuit board in a state pressed onto the rear casing.

Moreover, the holding portion may be formed by cutting and lifting up part of the rear casing, and the protective plate may be formed of a resin so as to be bendable.

Furthermore, the rear casing may have at least a portion thereof onto which the flexible circuit board is pressed formed of a metal and the flexible circuit board may be provided with a metal film for shielding against EMI so that, when the flexible circuit board is fixed to the rear casing y the fixing means, the metal film of the flexible circuit board conducts to the metal portion of the rear casing.

BEST MODE FOR CARRYING OUT THE INVENTION

Hereinafter, embodiments of the present invention will be described with reference to the drawings.

Figure 1:
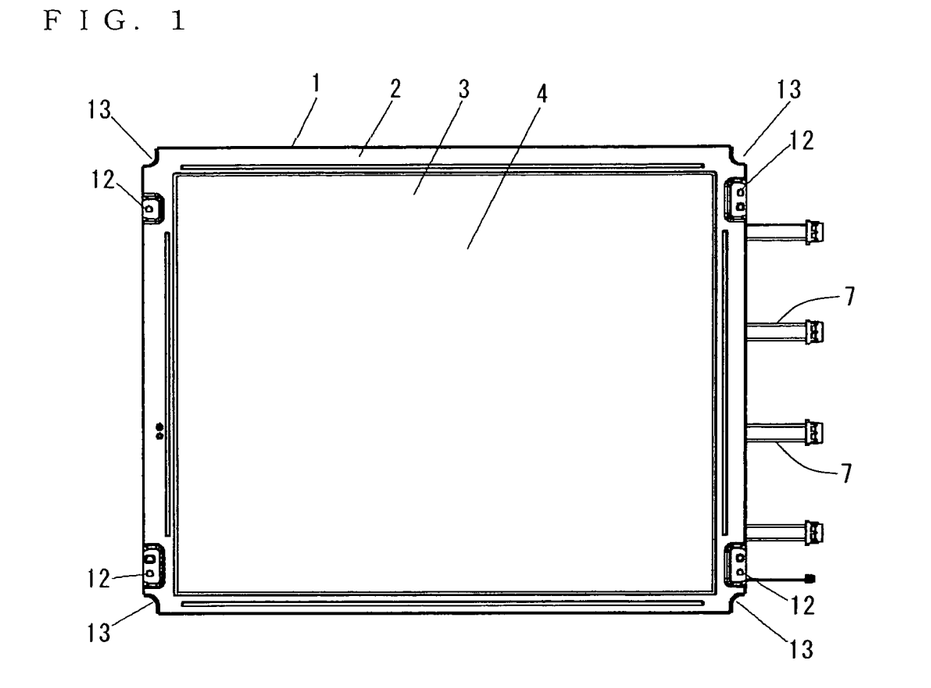
FIG. 1 is a plan view of a display module embodying the invention.
Figure 2:
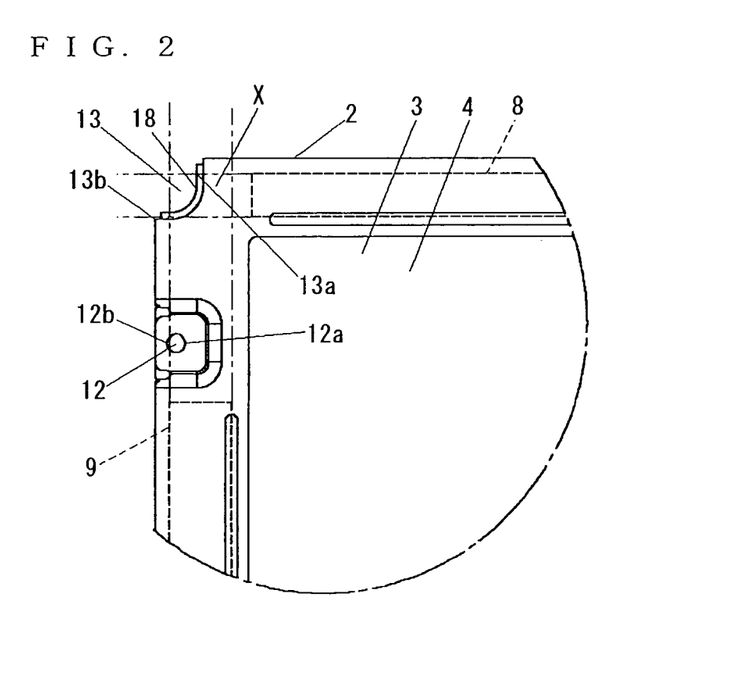
FIG. 2 is an enlarged plan view of a principal portion of FIG. 1.
Figure 3:
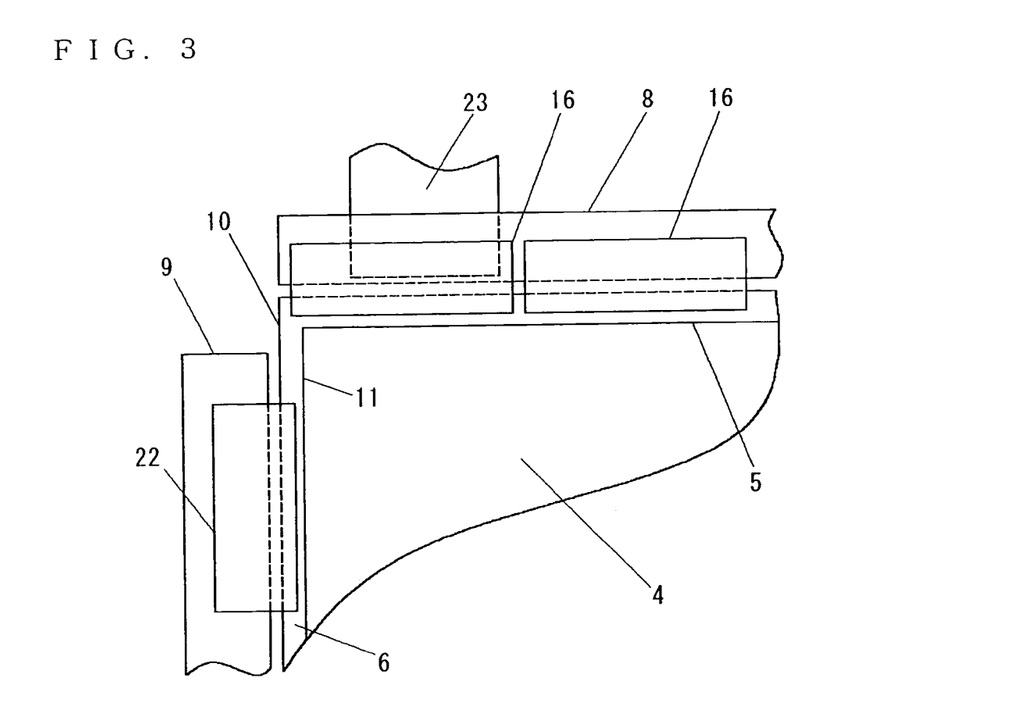
FIG. 3 is a plan view of a principal portion of the display module embodying the invention.
Figure 4:
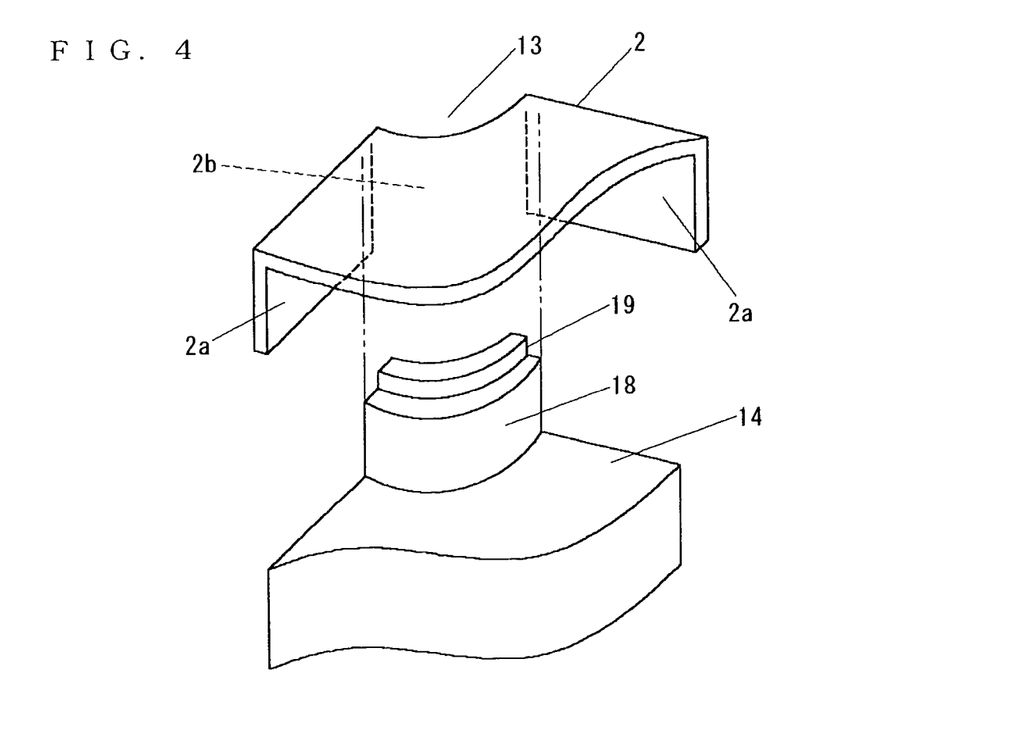
FIG. 4 is a perspective view of a principal portion of the display module embodying the invention.
Figure 5:
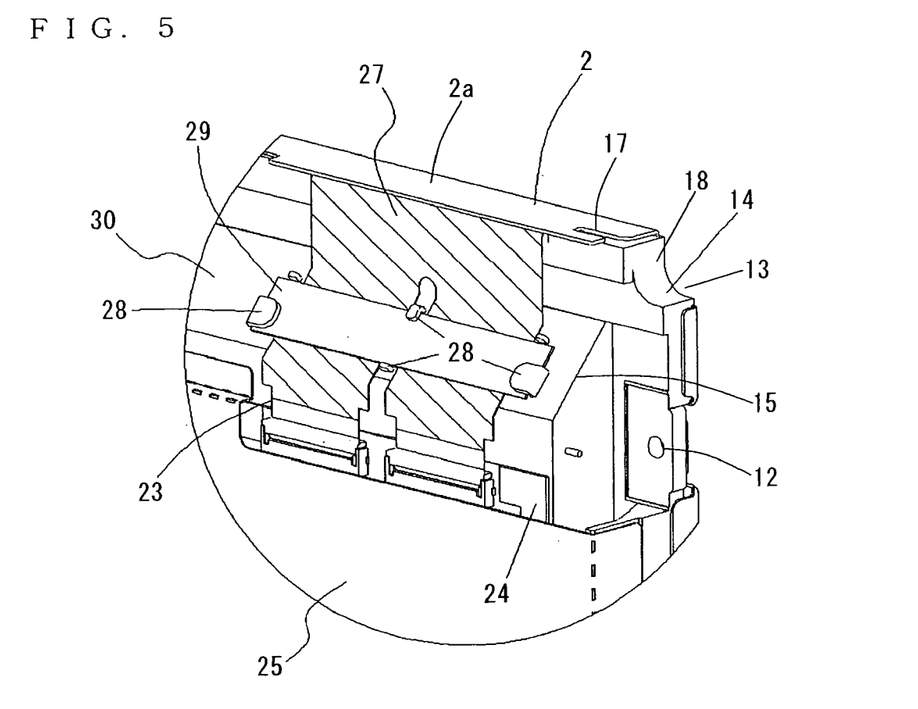
FIG. 5 is a perspective view, as seen from behind, of a principal portion of the display module embodying the invention.
Figure 6:
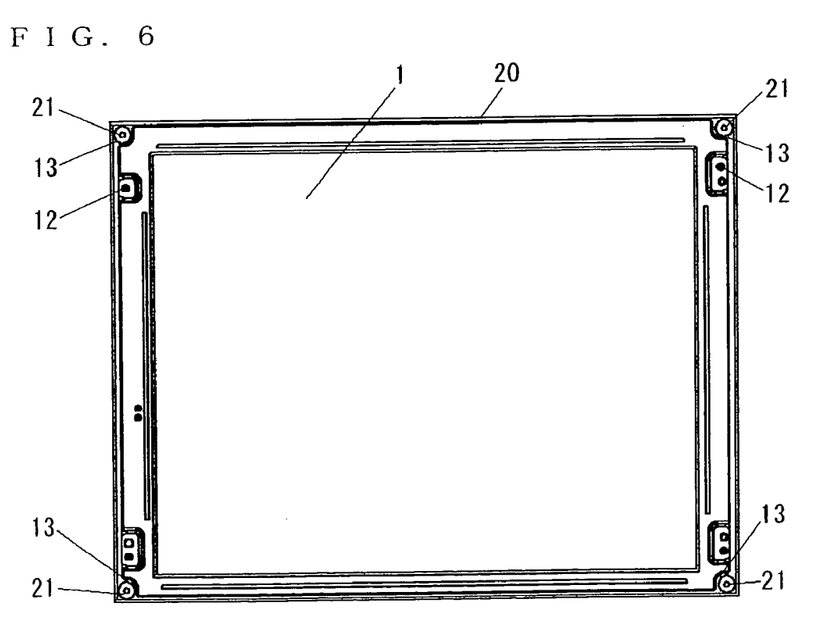
FIG. 6 is a plan view of a display unit embodying the invention, with its upper casing removed.
Figure 7:
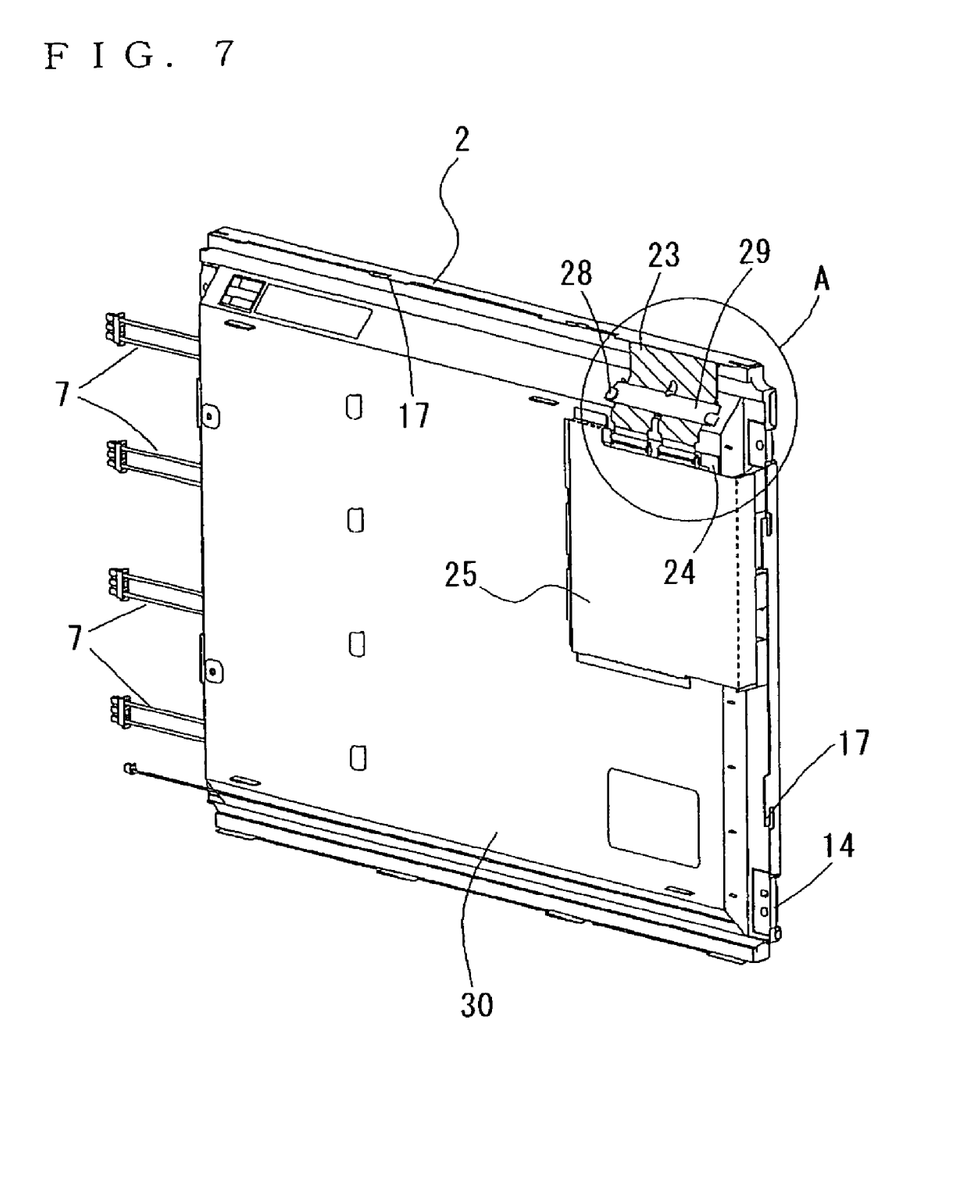
FIG. 7 is a rear perspective view of another display module embodying the invention.
Figure 8:
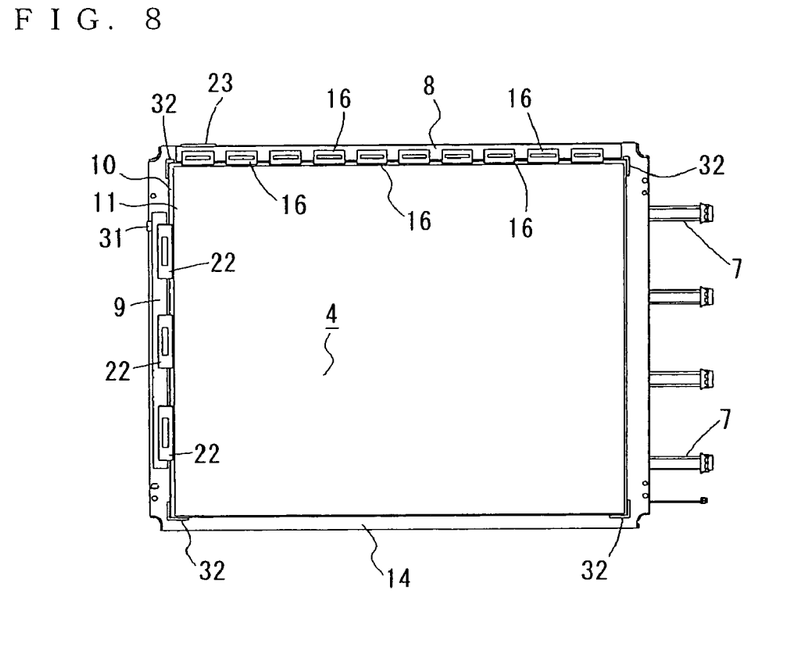
FIG. 8 is a front view of the display module embodying the invention, with its front frame removed.
Figure 9:
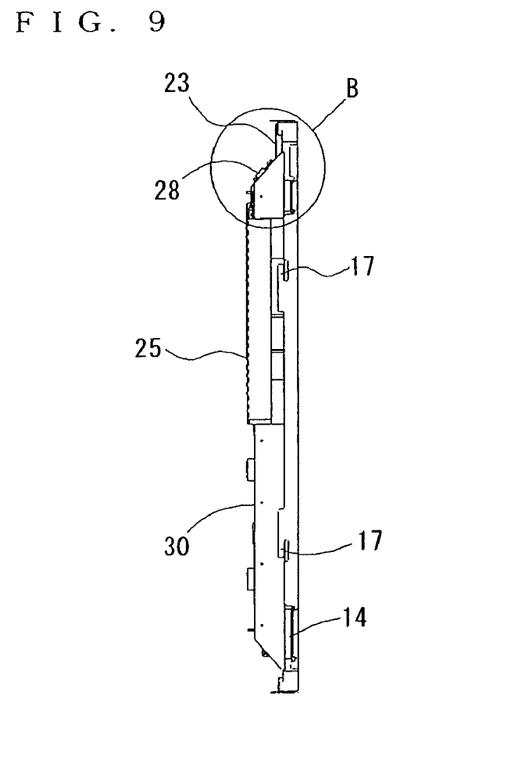
FIG. 9 is a side view of the display module. embodying the invention.
Figure 10:
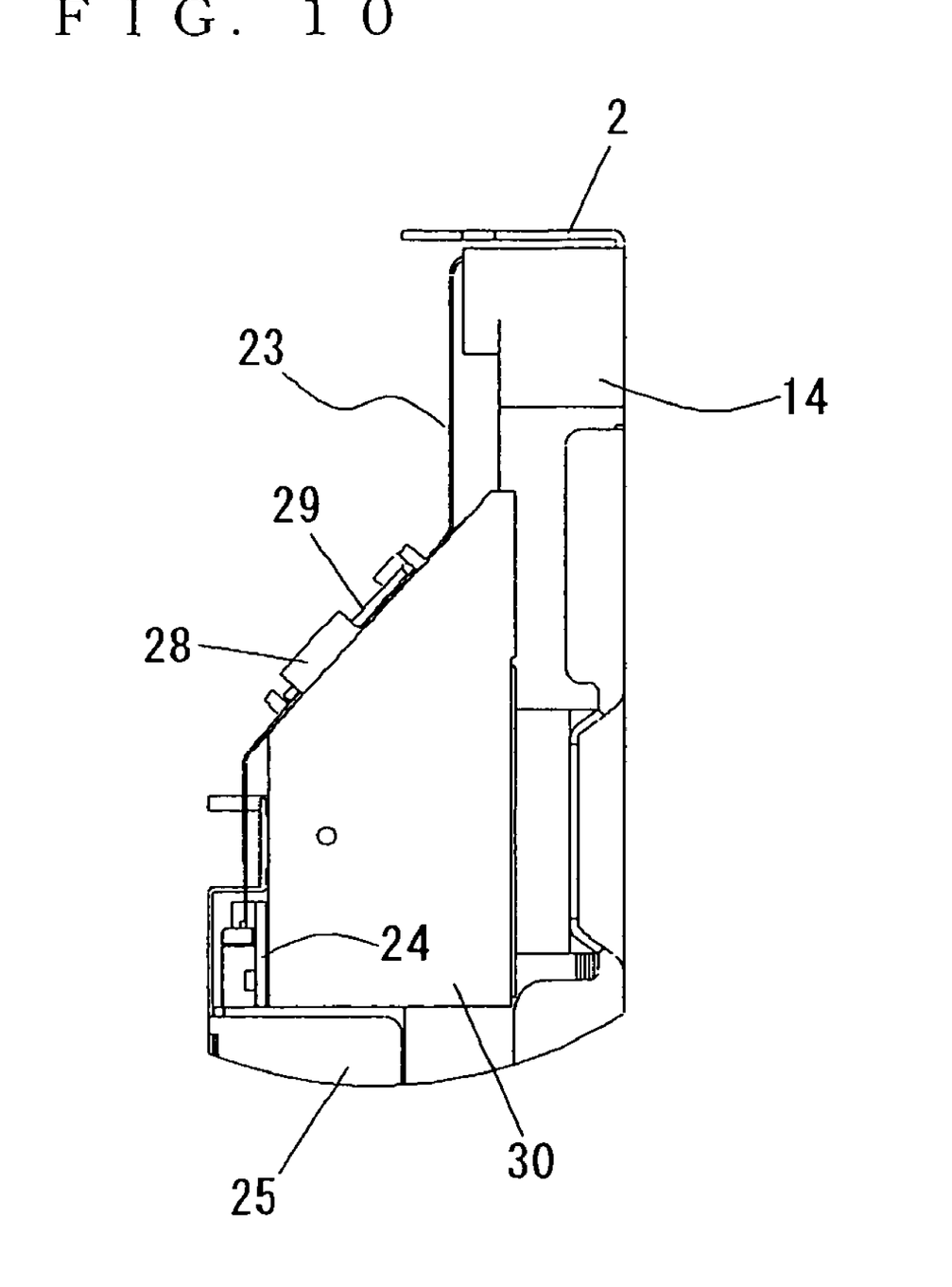
FIG. 10 is an enlarged outline view of part B shown in FIG. 9.

FIG. 1 is a plan view of a liquid crystal display module 1 embodying the invention, FIG. 2 is an enlarged plan view of a principal portion of FIG. 1, FIG. 3 is a plan view of a principal portion of the display module 1, FIG. 4 is a perspective view of a principal portion of the display module 1, FIG. 5 is a perspective view, as seen from behind, of a principal portion of the display module 1, FIG. 6 is a plan view of a display unit incorporating the display module 1, with its upper casing removed, FIG. 7 is a rear perspective view of another display module embodying the invention, FIG. 8 is a front view of the display module, with its front frame removed, FIG. 9 is a side view of the display module, and FIG. 10 is an enlarged outline view of part B shown in FIG. 9.

The liquid crystal display module 1 is provided with a picture-frame-shaped front frame 2 that surrounds it along its edges and a thin liquid crystal display panel 4 that shows through an opening 3 formed in the front frame 2. The display module 1 as a whole has a rectangular shape as seen in a plan view. The front frame 2 is made of a metal, and is formed by bending sheet metal.

The display panel 4 has a liquid crystal layer sandwiched between an upper and a lower substrate, and has a rectangular shape with a larger area than the opening 3 as seen in a plan view. The display panel 4 is formed by bonding together a pair of glass substrates 10 and 11 with a gap secured in between and then sealing liquid crystal between the glass substrates 10 and 11. On one substrate 10, there are formed a plurality of signal lines and a plurality of scanning lines in a matrix-like formation, with TFTs (thin-film transistor) formed at the intersections between the signal and scanning lines, and with pixel electrodes formed in the areas surrounded by the signal and scanning lines. The TFTs have their gate electrodes connected to the scanning lines, have their source electrodes connected to the signal lines, and have their drain electrodes connected to the pixel electrodes. The TFTs are turned on and off by scanning signals fed to the scanning lines so that voltages commensurate with image signals fed to the signal lines are fed to the pixel electrodes. On the other substrate 11, a light-shielding film is formed in the portion thereof facing the scanning and signal lines, and color filters of predetermined colors are formed so as to correspond to the individual pixels. Moreover, a common electrode is formed above the light-shielding film and color filters so as to face the pixel electrodes, so that the alignment of the liquid crystal molecules is controlled by the electric field between the common and pixel electrodes.

The glass substrate 10, on which the scanning and signal lines are formed, is slightly larger than the glass substrate 11, on which the color filters are formed, and therefore, when the glass substrates 10 and 11 are bonded together, portions of the glass substrate 10 along one of the longer-side edges and one of the shorter-side edges thereof are exposed. In the exposed longer-side edge portion, there are arranged input terminals for the signal lines, and, in the exposed shorter-side edge portion, there are arranged input terminals for the scanning lines. The input terminals for the signal lines are connected, by TAB (tape-automated bonding) 16, to a source drive circuit board (hereinafter referred to as the source PWB (printed wiring board) 8 serving as a first control circuit board. The source PWB 8 feeds image signals to the signal lines. The input terminals for the scanning lines are connected, by TAB 22, a gate drive circuit board (hereinafter referred to as the gate PWB) 9. The gate PWB 9 feeds gate signals to the scanning lines. The source PWB 8 and the gate PWB 9 are both printed circuit boards having an elongate rectangular shape, and have their respective control circuits formed on the printed circuit boards. The two PWBs 8 and 9 are respectively arranged along two adjacent side edges 5 and 6 of the display panel 4, and their longer-side length is slightly shorter than the sides that they respectively face. Thus, the two PWBs 8 and 9 are covered with the front frame 2. Here, the display panel 4 and the PWBs 8 and 9 are connected together by TAB 16 and 22 incorporating drive ICs for driving the liquid crystal. It is, however, also possible to connect them, for example, by flexible printed circuits incorporating no driver ICs.

To the surface of the source PWB 8 opposite to the surface thereof to which the TAB 16 is connected is connected one end of a flexible printed circuit 23 by way of which the source PWB 8 is electrically connected to a control circuit board 24 arranged on the rear side of the display module 1. Conventionally, the flexible printed circuit 23 is arranged on the same surface as the TAB 16, and therefore the flexible printed circuit 23 needs to be arranged in a position away from the TAB 16 along the longer sides of the source PWB 8. To makes this possible, the source PWB 8 is made longer than the longer-side dimension of the source PWB 8 so that the flexible printed circuit 23 is connected to the portion of the source PWB 8 that protrudes from the shorter side of the display panel 4. This makes the display module 1 larger, and makes it difficult to form notches in corners of the display module 1.

By contrast, according to the present invention, as described above, the flexible printed circuit 23 is arranged on the surface opposite to the TAB 16, and this permits the connection position of the flexible printed circuit 23 to be located comparatively freely. As a result, it is possible to reduce the longer-side dimension of the source PWB 8, and thereby alleviate the restrictions to be met in the corner portions of the display module 1.

At opposite side edges of the display module 1, specifically, in this example, at each of the shorter side edges thereof, a plurality of fitting holes 12 are formed so as to penetrate the display module 1 from the front surface to the rear surface thereof These fitting holes 12 are used to fix the display module 1 to the casing of the display unit with screws or the like.

In the four corners of the display module 1, notches 13 are formed so as to penetrate the display module 1 from the front surface to the rear surface thereof These notches 13 are formed symmetrically at the left-hand and right-hand sides of the display module 1, but instead may be formed symmetrically at the upper and lower side edges of the display module 1. It is particularly preferable to form the notches 13 in four corners; it is, however, also possible to form at least two notches at both end of one side edge. In this case, the notches 13 are formed at both ends of that one of the longer-side edges of the display module 1 along which the source PWB 8 is arranged, or at both ends of that one of the shorter-side edges of the display module 1 along which the source PWB 9 is arranged. The notches 13 may be formed away from corners, i.e., in the middle of side edges.

As shown in FIG. 2, one of the notches 13 located at both ends of the side edges along which the source PWB 8 and gate PWB 9 are arranged may be located so as to include the area X where the extension lines of the source PWB 8 and gate PWB 9, which are adjacent to each other, cross each other The notches 13 are, as seen in a plan view, fan-shaped with the center located at the cross section between the extension lines of the peripheral edges of the display module 1 and with the radius roughly equal to the width of one of the source PWB 8 and gate PWB 9 and greater than twice the radius of the fitting holes 12. It is preferable that the notches 13 be given a shape convex toward the center of the display module 1 as seen in a plan view, because this helps prevent protrusion of the bosses described later. However, the notches 13 may be given, other than a fan-like shape, a rectangular or similar shape of which the diagonal length is greater than twice the radius of the fitting holes 12.

The inner edge 13a of the notches 13 (the point thereof closest to the center of the display module 1 relative to the side edges thereof at which the fitting holes 12 are formed) is located inward of the inner edge 12a of the fitting holes 12. This helps give the notches 13 a large area as seen in a plan view, and thus makes it possible to secure a wide area for the arrangement of the bosses 21 described later. Moreover, the outer edge 13b of the notches 13 (the outermost point thereof relative to the side edges of the display module 1 at which the fitting holes 12 are formed) is located outward of the outer edge 12b of the fitting holes 12. This helps locate the fitting holes 12 within the area corresponding to the notches 13, and thus helps make narrower the peripheral area of the display module called the frame.

The display module 1 is provided with a support frame 14 made of, for example, a resin for supporting the display panel 4. The support frame 14 is, as seen in a plan view, so shaped as to support the peripheral portion of the display panel 4, the source PWB 8, and the gate PWB 9. In a case where the display panel 4 is of the transmissive type, the support frame 14, like the front frame 2, is formed so as to have a picture-frame-like shape with an opening formed in a central portion thereof On the rear side of the support frame 14, it is possible to arrange a backlight device 15 as necessary, as in a case where the display panel 4 is of the transmissive type.

The support frame 14 has a plurality of stoppers 32 provided around the rim of the opening formed in the central portion thereof so that the glass substrate 10 is positioned with the side edges thereof making contact with the stoppers 32. When the display panel 4 is fit in the support frame 14, the glass substrate 10 makes contact with the stoppers 32, and thereby the display panel 4 is held in the support frame 14. With the display panel 4 supported in the support frame 14, the front frame 2 is arranged on the front-surface side of the display panel 4, and a rear casing 30 is arranged on the rear-surface side thereof. Then, the front frame 2 and the rear casing 30 are fixed together with the display panel 4 and the support frame 14 sandwiched between them to form the display module.

The front frame 2 is formed of, for example, a metal such as Al. The peripheral portion of the front frame 2 is so bend as to cover the side faces of the support frame 14, and, at appropriate places in the peripheral portion, bending pieces 17 are formed by cutting out portions thereof By bending these bending pieces 17 toward the rear casing 30, it is possible to fix the front frame 2 to the rear casing 30.

The backlight device 15 is of a direct-lit type having a plurality of linear light sources arranged immediately behind the display panel 4 inside the rear casing 30. It is, however, also possible to use a backlight device of an edge light type having a light source arranged on one edge face of a light guide plate. FIG. 1 shows how the leads 7 from the light sources run out of the display module 1 at the right-hand side edge thereof These leads 7 are bent onto the rear side of the display module 1 in the assembly process.

Inside the rear casing 30, there are housed a plurality of fluorescent lamps, which are arranged along the longer sides of the display panel 4. The rear casing 30 is formed of a metal such as Al, and its inner surface is so formed as to efficiently reflect the light from the fluorescent lamps. A reflective plate may be arranged between the fluorescent lamps and the rear casing 30. The rear casing 30 has a shape greatly protruding on the rear-surface side so that it can house the fluorescent lamps.

In a portion of the rear surface of the rear casing 30, there is arranged a control circuit board (hereinafter referred to as the control PWB) 24 serving as a second control circuit board, and this control PWB 24 is covered with a protective cover 25. In the control PWB 24 are arranged control circuits that feed the source PWB 8 and gate PWB 9 with necessary signals. The source PWB 8 and the control PWB 24 are connected together by a FPC (flexible printed circuit) 23, and the gate PWB 9 and the control PWB 24 are connected together with a FPC (flexible printed circuit) 31.

It is to be noted that the FPC 31, which is covered with the protective cover 25, is not shown in FIG. 7.

The FPC 23 is bifurcated in a portion thereof closer to the PWB 24, and has a wiring pattern laid thereon so as to electrically connect together the source PWB 8 and the control PWB 24. Insulated from this wiring pattern, metal foil 27 of Al or Cu is bonded to the FPC 23 to lay a metal film thereon for shielding against EMI. In FIG. 5, the hatched portion of the FPC 23 represents the metal foil 27. This metal foil 27 is formed in the greater part of both the surface of the FPC 23 that faces the rear casing 30 and the surface thereof that does not face the rear casing 30, and the portions of the metal foil 27 that are formed on those two surfaces are electrically connected together. These portions of the metal foil 27 formed on the two surfaces are connected together by laying metal foil 27 also in edge portions of the FPC 23 so that the metal foil 27 as a whole is continuous from one surface to the opposite, or by forming contact holes at appropriate places in the FPC 23 so as to electrically connect together the portions of the metal foil 27 formed on the two surfaces. In this embodiment, bonding the metal foil 27 to the FPC 23 makes it possible to achieve shielding against EMI with a simple structure and at low cost.

On the rear casing 30 are formed holding pieces 28 for holding a protective plate 29. The holding pieces 28 are formed by cutting and lifting up portions of the rear casing 30, and are located at both width-direction sides of FPC 23 and between the bifurcated portions of the FPC 23. The protective plate 29 is formed of a resin such as plastic, and has the shape of an elongate plate. The protective plate 29 is bendable in response to a force that acts thereon along the longer sides thereof, and is resilient so as to recover its original shape when the force acting thereon is removed. The protective plate 29 may be formed of a metal. When a protective plate 29 made of a metal is used, however, since it is inferior to one made of a resin in the resilience with which it recovers its original shape, the shape and location of the holding pieces 28 need to be so devised as to be suitable for the protective plate made of a metal. To fit the protective plate 29 to the holding pieces 28, first, one end of the protective plate 29 is put behind one of the holding pieces 28 located at both width-direction sides of the FPC 23, and then, with the FPC 23 put between the protective plate 29 and the rear casing 30, the protective plate 29 is bent so that its other end is put behind the other of the holding pieces 28 located at both width-direction sides of the FPC 23. Then, by exploiting the resilience of the protective plate 29 itself, the protective plate 29 is fitted inside the holding pieces 28. As a result, the protective plate 29 is fixed by being supported by the holding pieces 28, and thus the FPC 23 is fitted to the rear casing 30 by being pressed onto it by the protective plate 29.

In this embodiment, a side face portion (where the FPC is located) of the rear casing 30, which greatly protrudes on the rear-surface side, is formed into an inclined surface, and on this inclined surface are formed the holding pieces 28, with which the FPC 23 is fixed. Accordingly, when the FPC 23 is fixed to the rear casing 30, the FPC 23 is prevented from being deformed into a stressful shape. This helps prevent an excessive load from being placed on the protective plate 29 and the holding pieces 28, which press the FPC 23. Moreover, by forming the side face portion of the rear casing 30 where the FPC 23 is fixed into an inclined surface, it is possible to secure a wide space where to form the holding pieces 28 and the like, and this makes easy the formation of the holding pieces 28 and the attachment and detachment of the protective plate 29.

When the FPC 23 is pressed onto the rear casing 30, the metal foil 27 of the FPC 23 makes contact with the rear casing 30, which is made of a metal. Thus, the metal foil 27 is grounded by way of the rear casing 30. In this way, the FPC 23 is shielded from EMI. The rear casing 30 can be grounded in various ways; for example, it may be connected to the ground line formed on the circuit boards, or may be so designed as to be grounded when the display module is fitted to the chassis of a large-screen monitor or the like.

The display panel 4 is fixed between the support frame 14 and the front frame 2 by being locked onto the support frame 14 by bending inward appropriate ones of the bending pieces 17 formed in a lower portion of the side faces 2a of the front frame 2 The backlight device 15 is fixed to the support frame 14 with its rear casing 30 fixed to the support frame 14 by bending inward appropriate ones of the bending pieces 17. It is, however, also possible to fix the backlight device 15 directly to the front frame 2, or by the use of a fixing means other than the bending pieces 17.

As shown in FIG. 4, in each corner of the front frame 2, a portion of its side faces 2a is cut out to permit the formation of the notch 13. This portion tends to permit dust to enter the display area between the display panel 4 and the backlight device 15, and this may adversely affect the display quality. To prevent entry of dust here, in the corner of the support frame 14 corresponding to the notch 13, a wall surface 18 is formed along the inner surface of the notch 13 so that this wall surface 18 stops the gap 2b between the side faces 2a formed in the corner of the front frame 2. In an upper portion of the wall surface 18, a lowered portion 19 corresponding to the thickness of the front frame 2 is formed, and this lowered portion 19 permits the positioning of the front frame 2. The same structure is formed for all of the other notches 13.

As shown in FIG. 6, the display module 1 having the notches 13 formed in the corners is housed in one (upper casing) 20 of a pair of casings for forming a display unit, and is fixed to that casing 20 by the use of the fitting holes 12. The unillustrated other casing (upper casing) has an opening formed therein through which to permit the display panel 4 to show. The display module 1 is generally fixed with screws put perpendicularly to the display panel 4, but may be fixed by any other fixing means. In the corners of the casing 20, bosses 21 are formed that are arranged so as to be coincident with the notches 13. The bosses 21 have a cylindrical shape with a radius equal to or slightly smaller than the radius of the notches 13, and have fixing screw holes formed at the center. In a case where the notches 13 have a rectangular shape, the bosses 21 may be given the shape of a rectangular cylinder.

Similar bosses are formed also on the other of the pair of casings so as to correspond to the bosses 21, and, by the use of these bosses 21, screws are tightened from one casing to the other so that the pair of casings encloses the display module 1 with the display module 1 sandwiched in between. The bosses 21 have to be formed on at least one of the pair of the casings.

In this embodiment, the FPC 23, which is conventionally left free, is fixed to the rear casing 30. This prevents the FPC 23 from being caught somewhere and broken during assembly or the like. Moreover, the protective plate 29 is detachably attached to the holding pieces 28. This permits easy detachment of the FPC 23 at the time of maintenance, and thus enhances serviceability. Furthermore, it is possible to reduce the space required to accommodate the FPC 23. In this embodiment, as a fixing means, the holding pieces 28, which are formed by cutting and lifting up portions of the rear casing 30, and the protective plate 29, which is made of a resin such as plastic, are used. These can be produced inexpensively and easily, and make the detachment of the protective plate 29 easy.

In this embodiment, to shield the FPC 23 from EMI, the metal foil 27 is bonded. However, the present invention may be practiced in any other manner. For example, it is possible to cover the entire FPC 23 with a metal mesh and keep this metal mesh in contact with the metal rear casing 30. Alternatively, it is possible to use as the FPC 23 a multilayer FPC and form a GND (ground) pattern in at least one arbitrary layer thereof, for example in the external layer, so as to cover the greater part of the FPC 23. In this case, part of this GND pattern is stripped so as to conduct to the rear casing 30 so that, when the FPC 23 is held in the rear casing 30, the GND pattern of the multilayer FPC conducts to the rear casing 30.

It should be understood that the present invention may be practiced in any other manner than in the embodiment specifically described above within the scope of the invention. For example, the protective plate may be screwed onto the rear casing, or holding pieces provided separately from the rear casing may be fixed to the rear casing. In the embodiment, TFTs are used as switching devices that connect to the pixel electrodes. However, the present invention is applicable not only to configurations employing TFTs but also to those employing MIM as switching devices.

The embodiment deals with a liquid crystal display module, but the present invention is applicable also to display modules having any other structure and to display units employing such display modules.

INDUSTRIAL APPLICABILITY

Display modules and display units according to the invention can be used in a variety of apparatuses such as liquid crystal display apparatuses and other apparatuses incorporating a display module having any other structure. Moreover, display modules according to the invention can be used in color liquid crystal television monitors and the like having a direct-lit backlight with a plurality of linear lamps such as fluorescent lamps arranged immediately behind a display panel.

The invention claimed is:

1. A display module provided with a picture-frame-shaped front frame, a display panel that shows through an opening formed in the front frame, and a support frame that supports the display panel, characterized in that notches are formed in four corners of the front frame and the support frame so as to penetrate from a front surface to a rear surface of the display module, and fitting holes are formed at different locations from the notches and at opposite side edges of the display module, the notches having a shape so recessed as to be convex toward a center of the display module as seen in a plan view, with an inner edge of the notches located inward of an inner edge of the fitting holes.

2. A display module as claimed in claim 1, further characterized in that the notches are fan-shaped with a radius greater than a radius of the fitting holes.

3. A display module as claimed in claim 1, further characterized in that the notches are rectangular with a width greater than a radius of the fitting holes.

4. A display module as claimed in claim 1, further characterized in that the display module is further provided with circuit boards respectively arranged along two adjacent side edges of the display panel and covered with the front frame, the notches being formed at both ends of at least one of the side edges of the display panel along which the circuit boards are arranged, with one of the notches located in an area where extension lines of the circuit boards arranged along the two adjacent side edges of the display panel cross each other.

5. A display module as claimed in claim 1, further characterized in that the support frame has wall surfaces formed along inner surfaces of the notches.

6. A display module as claimed in claim 1, further characterized in that the display module is further provided with a plurality of light sources arranged immediately behind the display panel, a rear casing for housing the light sources and covering a rear-surface side of the display panel, a first control circuit board mounted on the display panel, a second control circuit board arranged on a rear surface of the rear casing, a flexible circuit board for electrically connecting the first and second control circuit boards together, and fixing means for detachably fixing the flexible circuit board to the rear casing.

7. A display module as claimed in claim 6, further characterized in that the fixing means is provided with a holding portion formed on the rear casing and a protective plate detachably supported by the holding portion so that the protective plate, when fitted to the holding portion, holds the flexible circuit board in a state pressed onto the rear casing.

8. A display module as claimed in claim 7, further characterized in that the holding portion is formed by cutting and lifting up part of the rear casing, and the protective plate is formed of a resin so as to be bendable.

9. A display module as claimed in claim 6, further characterized in that the rear casing has at least a portion thereof onto which the flexible circuit board is pressed formed of a metal and the flexible circuit board is provided with a metal film for shielding against EMI so that, when the flexible circuit board is fixed to the rear casing by the fixing means, the metal film of the flexible circuit board conducts to the metal portion of the rear casing.

10. A display unit having a display module housed inside a pair of casings,
wherein the display module is provided with a picture-frame-shaped front frame, a display panel that shows through an opening formed in the front frame, and a support frame that supports the display panel, with notches formed in four corners of the front frame and the support frame so as to penetrate the display module from a front surface to a rear surface thereof, and with fitting holes formed at different locations from the notches and at opposite side edges of the display module, the notches having a shape so recessed as to be convex toward a center of the display module as seen in a plan view, with an inner edge of the notches located inward of an inner edge of the fitting holes,
and further wherein at least one of the casings is provided with bosses located inside the notches.

11. A display module provided with a picture-frame-shaped front frame that is made of a metal and that is formed by bending sheet metal and a liquid crystal layer that shows through an opening formed in the front frame and that is formed by bonding together a pair of glass substrates with a gap secured in between and then sealing liquid crystal between the glass substrates, with fitting holes formed at opposite side edges of the display module so as to penetrate from a front surface to a rear surface thereof, wherein:
on one substrate, a plurality of signal lines and a plurality of scanning lines are formed in a matrix-like formation, with TFTs formed at intersections between the signal and scanning lines, and with pixel electrodes formed in areas surrounded by the signal and scanning lines;

the TFTs have gate electrodes thereof connected to the scanning lines, have source electrodes thereof connected to the signal lines, and have drain electrodes thereof connected to the pixel electrodes;

on the other substrate, a light-shielding film is formed in a portion thereof facing the scanning and signal lines, with color filters of predetermined colors formed so as to correspond to individual pixels, and with a common electrode formed above the light-shielding film and color filters so as to face the pixel electrodes;

the glass substrate on which the scanning and signal lines are formed is slightly larger than the glass substrate on which the color filters are formed and, when the glass substrates are bonded together, portions of the glass substrate along one of the longer-side edges and along one of the shorter-side edges thereof are exposed so that, in the exposed longer-side edge portion, input terminals for the signal lines are arranged and, in the exposed shorter-side edge portion, input terminals for the scanning lines are arranged; and notches are formed at both ends of each of the opposite side edges of the display module so as to penetrate from the front surface to the rear surface thereof, the notches having a shape convex toward a center of the display module as seen in a plan view, with an inner edge of the notches located inward of an inner edge of the fitting holes.

* * * * *